United States Patent [19]

Casteel et al.

[11] 4,314,429
[45] Feb. 9, 1982

[54] SIDING HOLDER

[76] Inventors: Ernest Casteel, c/o George Spector, 3615 Woolworth Bldg., 233 Broadway; George Spector, 3615 Woolworth Bldg., 233 Broadway, both of New York, N.Y. 10007

[21] Appl. No.: 123,000
[22] Filed: Feb. 20, 1980
[51] Int. Cl.³ .................. E04F 21/00; E04D 15/00
[52] U.S. Cl. ........................... 52/127; 52/105; 52/547; 52/749
[58] Field of Search ............. 52/127, 547, DIG. 1, 52/105, 748, 741, 749; 269/94, 102

[56] References Cited

U.S. PATENT DOCUMENTS

| | | | |
|---|---|---|---|
| 2,511,083 | 6/1950 | Small | 52/547 |
| 2,519,656 | 8/1950 | Howe | 52/547 |
| 3,903,670 | 9/1975 | Robinson | 52/547 X |
| 3,904,184 | 9/1975 | Krueger | 52/DIG. 1 |
| 3,953,015 | 4/1976 | Taylor et al. | 52/DIG. 1 |
| 4,089,141 | 5/1978 | Heroux | 52/127 X |

FOREIGN PATENT DOCUMENTS

| | | | |
|---|---|---|---|
| 2343874 | 10/1977 | France | 52/547 |
| 43991 | 7/1934 | France | 52/547 |

Primary Examiner—J. Karl Bell

[57] ABSTRACT

A device for supporting one end of a lap siding while an opposite end is being nailed during a siding installation one a house; the device including, in one design, a hook for hooking over a top edge of a siding already installed, and a hanger adjustably mounted on the hook for a next above siding member to rest thereupon at a correct distance of overlap while the opposite end is manually held in the nailing progress.

3 Claims, 4 Drawing Figures

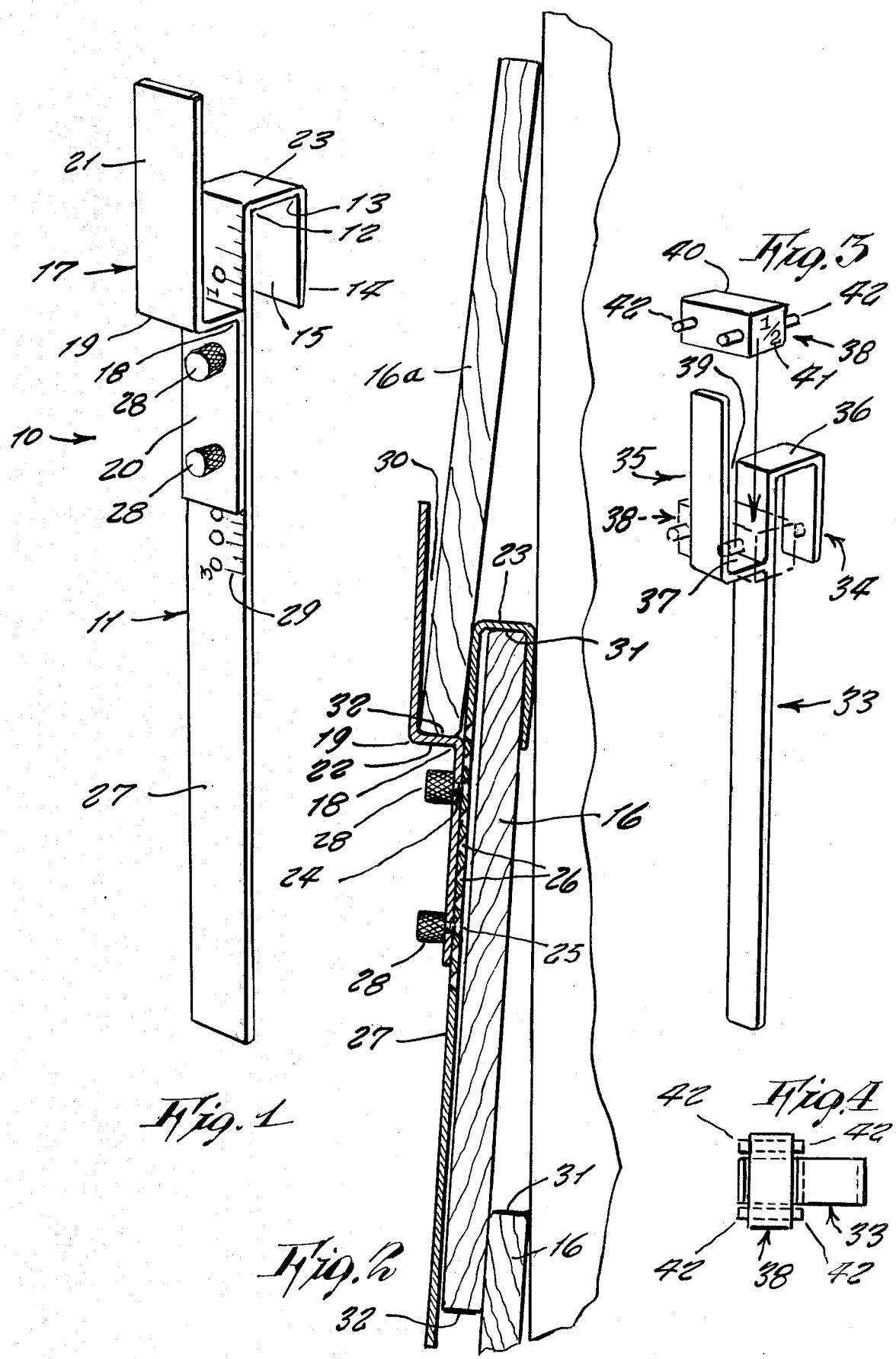

SIDING HOLDER

This invention related generally to house construction tools. More specifically it relates to siding holders.

It is well known that when a lap siding is being installed, that the long boards require both ends thereof being held up in correct location before nailing may be commenced so to insure the board being precisely horizontal. Thus two carpenters are needed for the job being done efficiently and correct.

A principal object of the present invention is to provide a siding holder that allows a person working alone to correctly and efficiently install a siding on a house, thus saving on the necessity of hiring a second worker.

Another object is to provide a siding holder which is adaptable for installation of broad panel siding as well as long board siding.

FIG. 1 is a perspective view of one design of the invention in which the upper jaw is adjustable so that siding overlap can be greater or less, so to not require any extra loose parts.

FIG. 2 shows the invention of FIG. 1 in use supporting a siding while being nailed up.

FIG. 3 is another design of the invention in which different thickness of blocks can be inserted in the upper jaw so to change the overlap dimension.

FIG. 4 is a top view thereof.

Referring now to the drawing in greater detail, and more particularly to FIGS. 1 and 2 thereof at this time, the reference numeral 10 represents a siding holder according to the present invention, wherein there is a hook member 11 made from stiff strap metal such as aluminum or steel and which measures approximately $\frac{1}{8}$ inch thick, $\frac{1}{2}$ inch wide and $9\frac{1}{2}$ inches long. An upper end thereof is U-shape bent by means of bends 12 and 13 so that a terminal end 14 extends downward in order to enclose a space 15 that is sufficiently wide enough for a thickness of a lap siding board 16 being received therein.

A hanger 17 of similar stiff strap metal is also a same thickness and width. It is S-shape bent by means of bends 18 and 19 in opposite directions so to form opposite end legs 20 and 21 as well as intermediate legs 22, that is approximately a same length as a leg 23 of the hook. The downward leg 21 includes a pair of holed 24 therethrough for receiving flat head screws 25 inserted through selective pairs of a row of countersunk holes 26 along a downward leg 27 of the hook. A knurled nut 28 is fitted on each screw.

The leg 27 is calibrated with a linear scale 29 so as to allow a selected depth of recess 30 below an upper edge 31 of a mounted lap siding board 16, so as to control the amount of overlap between a lower edge 32 of a board 16a, being installed, and the already-mounted board 16. Thus overlap is selective, as wanted.

In a modified design, shown in FIG. 3, the siding holder 33 is forged in a single piece so to include inverted U-shaped hook 34 and a hanger rest 35. In this design the horizontal wall 36 of the hook is a fixed elevation higher than the horizontal wall 37 of the hanger. Adjustability of siding overlaps in this design is achieved by means of a set of variously thick shim adapters 38 that are selectively slide fitted inside the recess 39 of the hanger. Each adapter comprises an elongated block 40 having an identifying height dimension 41 on one end thereof. A pair of sideward protrusions 42 on opposite sides serve as guides for fitting the holder 33 therebetween. In use, the siding 16a rests on top of the adapter.

What is claimed as new, is:

1. A siding holder comprising in combination an inverted U-shaped hook and a hanger forming an upward notch, said hook adapted to rest on an upper edge of an already-installed lap siding board, said upward notch adapted to support an uninstalled lap siding wherein said hook and hanger are attached to a longitudinal flat leg extending downwardly of said hook and hanger forming a common wall between said hook and hanger which are disposed adjacent each other on opposite sides of said leg, said hanger and hook having spaced transverse surfaces adapted to abut said lapped sidings, in further combination with means for varying the spacing of said surfaces.

2. A holder as in claim 1 wherein said means comprise shims of varying size adapted for insertion on said hangar surface including spaced guides adapted to fit on said hangar to retain said shims in proper position.

3. A holder as in claim 1 wherein said means is provided by said hangar being movable relative to said hook, including a small leg depending from said hangar in abutment with the first said leg having connectors for securing said legs at varying locations, including a scale on the first said leg for measuring the space between the said surfaces.

* * * * *